No. 733,017. PATENTED JULY 7, 1903.
R. K. DUNCAN.
APPARATUS FOR MAKING PHOSPHORUS.
APPLICATION FILED MAY 8, 1901. RENEWED MAY 2, 1903.
NO MODEL.
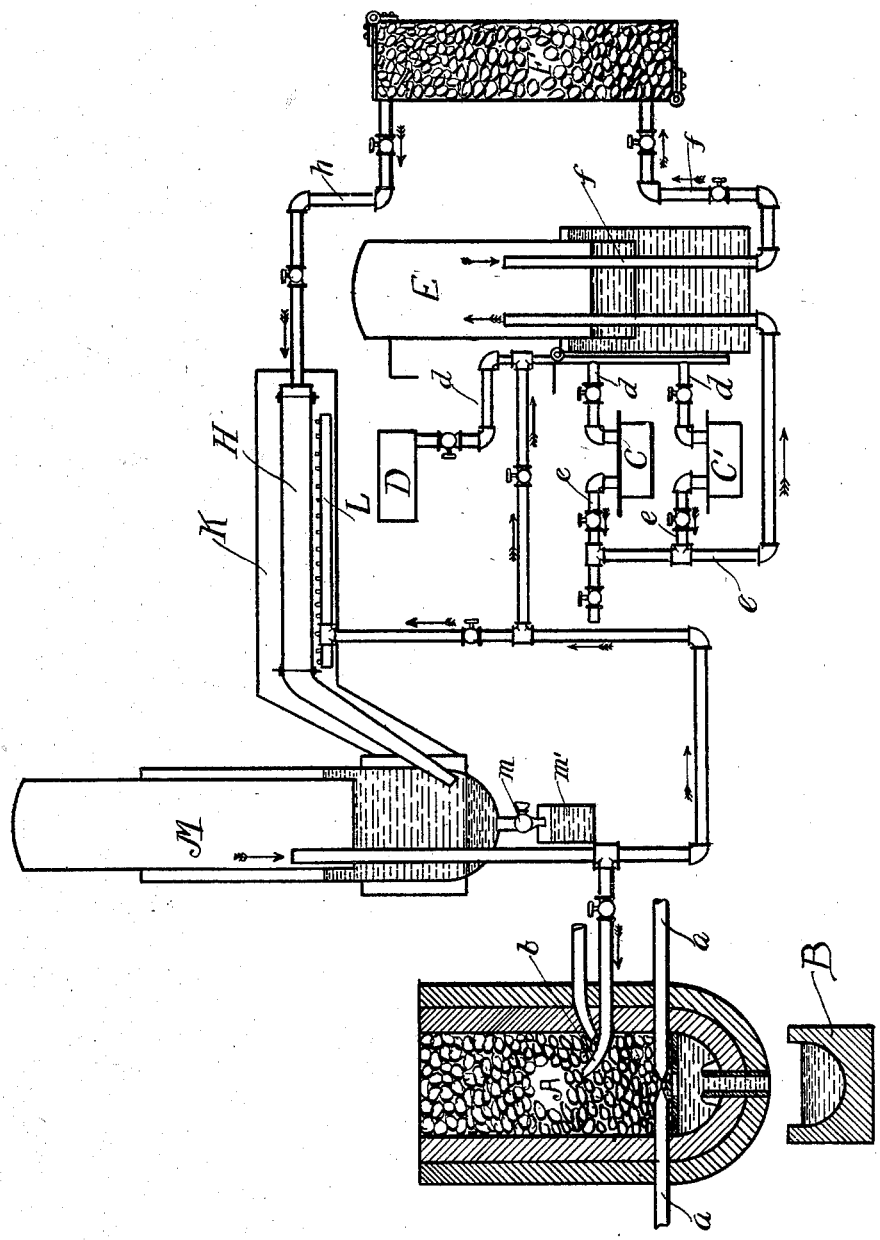
Witnesses:
Inventor:
Robert K. Duncan
Attorney.

No. 733,017.

Patented July 7, 1903.

UNITED STATES PATENT OFFICE.

ROBERT K. DUNCAN, OF POTTSTOWN, PENNSYLVANIA, ASSIGNOR TO GENERAL CHEMICAL COMPANY, OF NEW YORK, N. Y.

APPARATUS FOR MAKING PHOSPHORUS.

SPECIFICATION forming part of Letters Patent No. 733,017, dated July 7, 1903.

Application filed May 8, 1901. Renewed May 2, 1903. Serial No. 155,428. (No model.)

*To all whom it may concern:*

Be it known that I, ROBERT K. DUNCAN, a citizen of Canada, residing at Pottstown, in the county of Montgomery and State of Pennsylvania, have invented certain new and useful Improvements in Apparatus for Producing Phosphorus, of which the following is a specification, reference being had therein to the accompanying drawing.

This invention relates to an apparatus for carrying out the process for producing phosphorus embraced by my application, Serial No. 38,742, filed December 5, 1900.

The accompanying drawing is a diagrammatic illustration of my improved apparatus.

In practicing my new process phosphatic material of any nature that will when heated with carbon produce a phosphid is used. As examples of such phosphatic material bone-black, bone-ash, or mineral phosphates may be mentioned. The phosphatic material in powdered form is mixed with powdered carbon, and a small amount of tar is then preferably added to make the mixture cohere. The mixture is then dried and broken into lumps and subjected to heat in an electric furnace, as A, into which suitable electrodes $a$ extend for the purpose of producing an intense heat by electric sparking. A preliminary heating of the material in the furnace may be effected by a hydrogen-burner $b$, using the hydrogen which is a by-product of the process. By this operation calcium phosphid is formed, which is removed from the furnace into a receptacle B and then placed in a suitable generator, as C or C', of the type used for the generation of acetylene, where it is acted on by water running from a tank, as D, through pipes $d$ to the said generator or generators, the action of the water on the calcium phosphid resulting in the formation of phosphin, which is conducted through pipes $e$ to a gasometer, as E. This phosphin is next preferably passed from the gasometer E through a pipe $f$ to a drying-chamber F, filled with calcium phosphid, and the phosphin is then conducted through a pipe $h$ to a heating-chamber H, preferably in the form of a tube of aluminium arranged within a jacket K, and beneath which heating-chamber is a gas-burner L, serving to heat it. In this heating-chamber the phosphin is broken down into phosphorus and hydrogen. The resulting phosphorus is either red or yellow phosphorus, according to the heat employed, which is regulated at the will of the operator. If red phosphorus be formed, it remains in the aluminium tube, while if it is of the yellow form it distils over and is collected under water in a suitable receptacle, as gasometer M, into which the resulting hydrogen is conducted from the heating-chamber H and from which it may be conducted by suitable pipes to both the burners $b$ and L. The phosphorus is removed from beneath the water in a gasometer M through the valve $m$ into a suitable receptacle, as $m'$.

My invention is not to be understood as being limited to the details of construction herein shown and described, as these details may be varied widely within the limits of mechanical skill without departing from the essence of the invention, which will of course include equivalents for the different parts of the particular apparatus herein shown and described.

I do not herein claim the new process herein described for producing phosphorus, as the same is embraced by my application, Serial No. 38,742, hereinbefore referred to; but What I do claim as new, and desire to secure by Letters Patent, is—

The herein-described apparatus for producing phosphorus, consisting of the combination with a suitable electric furnace adapted to heat the phosphatic materials intensely, of a phosphatic-decomposition chamber for treatment of the phosphid with water, a storage-tank for the phosphin evolved, a drying-chamber connected with said storage vessel, a heating-chamber for decomposing the phosphin, and a suitable receiver connected with said heating-chamber, to receive the products of decomposition.

In testimony whereof I affix my signature in presence of two witnesses.

ROBERT K. DUNCAN.

Witnesses:
E. S. FRETZ,
C. G. BAIN.